Dec. 22, 1959   R. J. OLSON ET AL   2,917,783
METHOD FOR FORMING THERMOPLASTIC MATERIALS
Filed Oct. 21, 1954   3 Sheets-Sheet 3
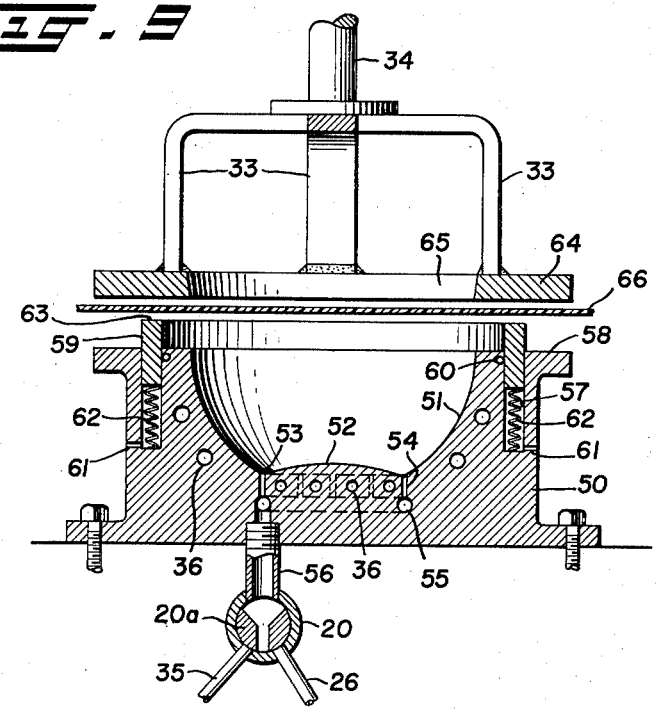
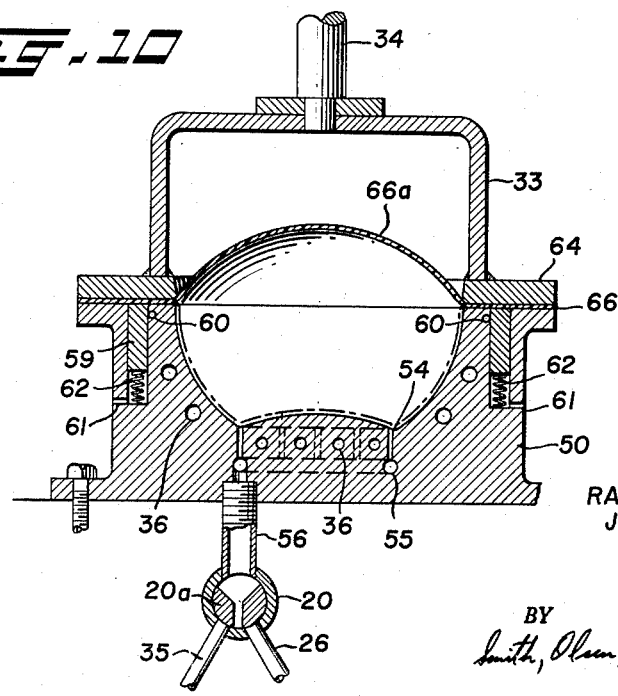
RAYMOND J. OLSON
JOHN E. PRESS
INVENTORS
BY
ATTORNEYS United States Patent Office 2,917,783
Patented Dec. 22, 1959

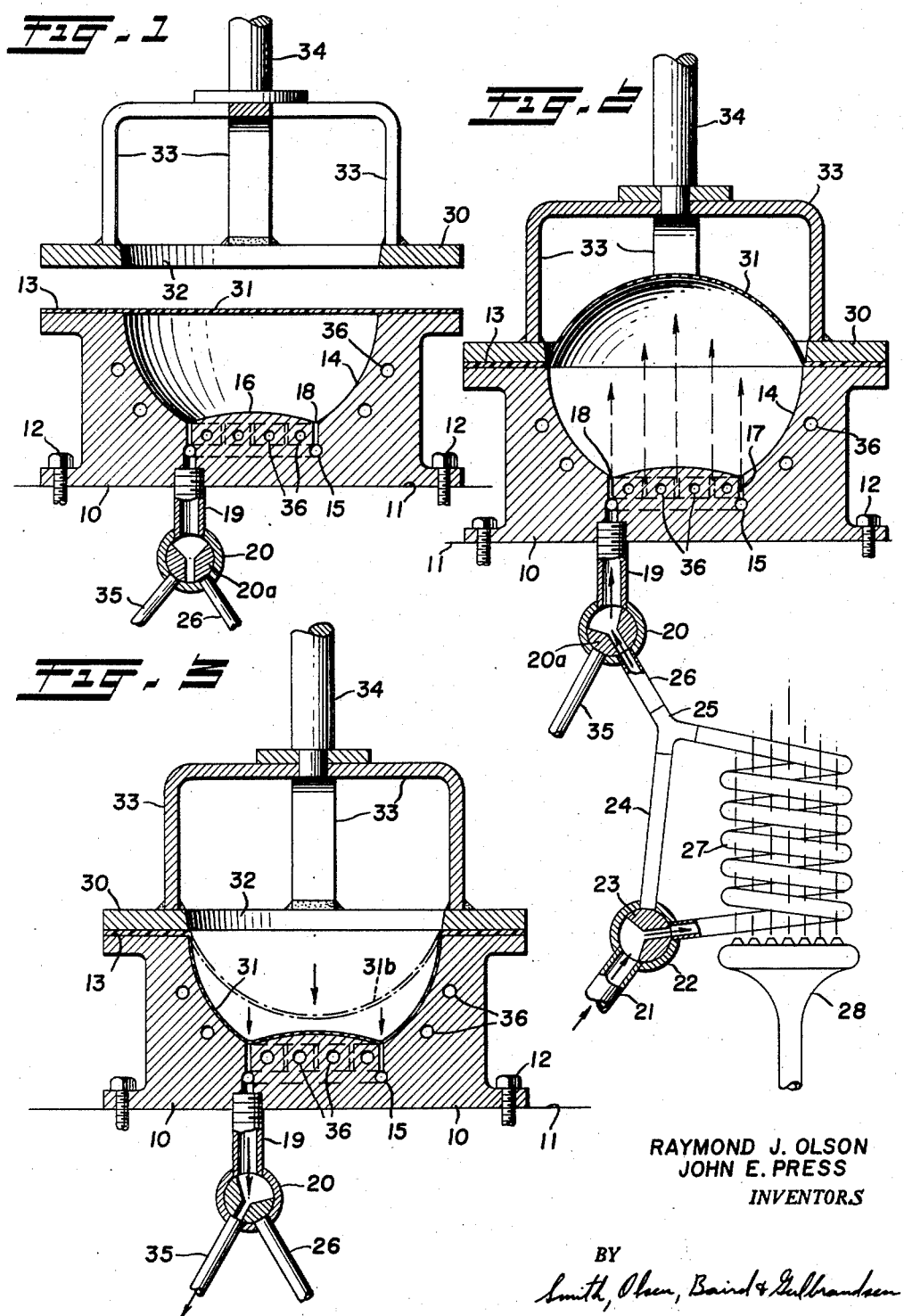

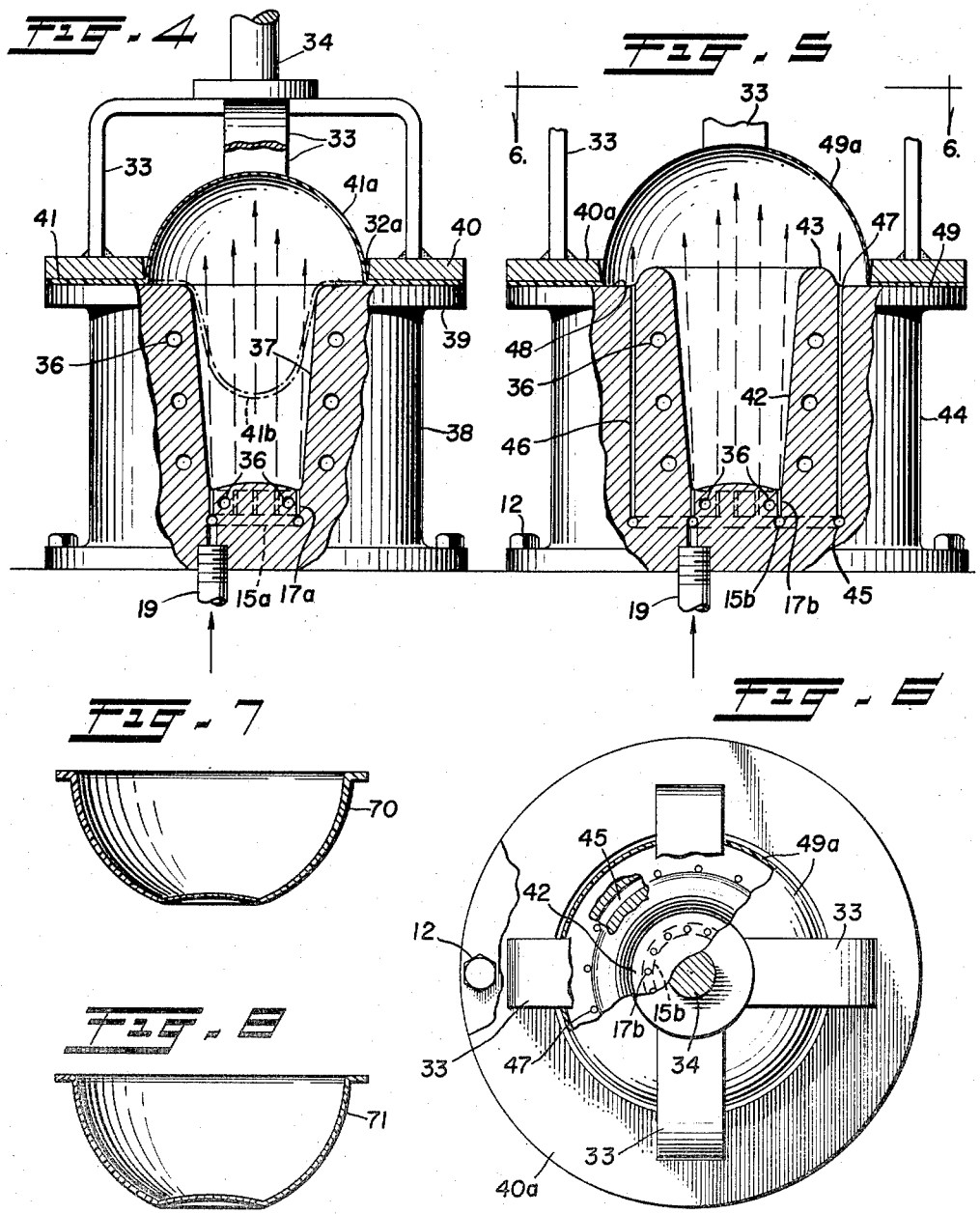

2,917,783

METHOD FOR FORMING THERMOPLASTIC MATERIALS

Raymond J. Olson, Skokie, and John E. Press, Niles, Ill., assignors to Federal Tool Corporation, Chicago, Ill., a corporation of Illinois Application October 21, 1954, Serial No. 463,756

9 Claims. (Cl. 18—56)

This invention relates to the art of draw-forming and shaping thermoplastic sheet materials, and more particularly to improved methods by which warm, ductile thermoplastic sheets may be formed into three-dimensional shapes having a more uniform wall thickness and a greater drawn depth than has heretofore been feasible with the use of old methods heretofore known.

The shaping of thermoplastic sheets heretofore has commonly been accomplished by placing a heated, and therefore softened, thermoplastic sheet across the opening or mouth of a negative die or cavity mold, and by pressing the sheet directly into the die by the action of a positive die or by the application of fluid pressure upon the sheet. In each instance difficulty has been encountered in producing formed objects having relatively uniform wall thicknesses, and the relative permissible drawn depths of acceptable objects formed by these older methods have been rather limited, due to unequal stretching of the thermoplastic material. This unequal stretching has been caused in large measure by the fact that a portion of the sheet being drawn has been brought into cooling contact with some part of the wall of the negative die cavity and/or with a part of the positive die, either immediately upon initiation of the drawing operation or very shortly thereafter before substantial drawing of the material has taken place. For example, when a positive die has been used to press the sheet into the mold cavity, the die itself ordinarily has first contacted the centre portion of the sheet, and the portion contacted has immediately begun to cool more rapidly than the portions of the sheet not yet contacted. This has caused unequal stretching of the material as the drawing operation has proceeded, with the result that the formed product has had substantial nonuniformity in its wall thickness. On the other hand, when fluid pressure has been used in accordance with methods heretofore known for pressing or drawing the sheet inwardly into the mold cavity, the sheet has merely been distended or ballooned inwardly into the cavity and the peripheral portions of the distended sheet have come into cooling contact with the inner surfaces of the cavity adjacent its mouth before substantial inward distension has taken place. The peripheral portions of the inwardly distended sheet have therefore been stretched substantially less than the central portions as the drawing has proceeded, with the result that the wall thickness of the formed object has been quite non-uniform. This non-uniformity in the wall thickness of objects formed by earlier methods has increased in proporiton to increases in the ratio of the drawn depth to the drawn width, and it has therefore been necessary heretofore to keep the depths of such drawn objects relatively shallow, especially when reasonably uniform wall thicknesses have been desired.

One of the principal objects of the present invention is to provide a new method by which three-dimensional shapes may be draw-formed in a cavity mold by the use of fluid pressure in a way so as to permit deeper drawing, while at the same time providing greater uniformity of wall thickness in the drawn object. Applicants have found that this object may be attained by partially pre-forming and stretching the ductile sheet before any part of the area of the sheet to be formed is brought into cooling contact with the interior of the mold cavity or any other part of the apparatus. In this connection applicants have discovered that a ductile thermoplastic sheet may be formed with greatly improved results by clamping the sheet in position opposite the mouth of a cavity mold and by pre-forming or stretching the material of the sheet in a substantially uniform manner by first distending or ballooning the sheet outwardly away from the mouth of the mold, and immediately thereafter reverse-ballooning the sheet inwardly into the mold cavity and thereupon drawing the same into close contact with the cooling inner surfaces of the cavity, thereby giving the sheet its desired shape. This new method contemplates the use of differential fluid pressures on the sheet to produce the distension or ballooning of the sheet, first outwardly of the mold to produce the initial stretching of the material, and then inwardly with respect to the mold, whereupon the sheet comes into contact with the interior of the mold cavity only after it has already been subjected to strecthing during the outwardly ballooning step of the method. As will be explained more fully hereinafter, a substantial portion of the necessary stretching of the sheet, in the practice of the present method, is thus accomplished before any portion of the sheet comes into cooling contact with the mold cavity, thereby greatly reducing the tendency toward non-uniform wall thicknesses in the formed shape and thereby permitting deeper drawing with better results.

It will be apparent, as the description of the method proceeds below, that the initial area of the sheet ballooned outwardly away from the mouth of the mold cavity may be considerably greater than the cross-sectional area of the mouth of the mold. This initial area is stretched, and therefore enlarged, during the outward balooning step, thereby presenting to the mold cavity a very considerable area of stretched sheet material which, when drawn inwardly into the mold cavity, immediately drops relatively deeply into the cavity and thus permits deep drawing, this being another feature of the present invention.

Yet another object of the invention is to provide relatively simple and inexpensive apparatus for carrying out the method and certain variations thereof, among which is the provision of a cavity mold with means for clamping a hot ductile sheet of thermoplastic material across the mouth of the cavity, and with means for first introducing compressed air into the cavity for ballooning the clamped sheet outwardly and means for thereafter evacuating the air and effecting a vacuum in the cavity for drawing the outwardly ballooned material into the cavity and into close contact with the surfaces thereof.

Still another object of the invention is to provide in conjunction w th a cavity mold, means for clamping a hot ductile thermoplastic sheet in position spaced outwardly from the mouth of the cavity and for moving the sheet inwardly toward the cavity mouth, thereby entrapping air under the sheet and compressing the same during movement of the sheet to cause the same to balloon outwardly away from the mouth of the cavity prior to evacuat on of the air and the introduction of vacuum in the cavity to draw the sheet inwardly into the same.

These and other objects and advantages of the present method and apparatus will be apparent from the following description thereof, taken with the accompanying drawings, wherein:

Fig. 1 is a vertical cross-sectional view of one form of simpl fied apparatus for practicing the method, a clamping plate being shown in the view in its raised position with a hot, ductile sheet of thermoplastic material laid across the face of a cavity mold preparatory to being clamped thereon by the clamping plate;

Fig. 2 is a similar view of the same apparatus but with the clamping plate lowered to its clamping position and with a valve turned to a position introducing heated air into the interior of the cavity of the mold to distend or balloon the ductile thermoplastic material upwardly to stretch the same;

Fig. 3 is a similar view, but showing the valve turned to another position to apply a vacuum to the interior of the mold, the vacuum having drawn the outwardly ballooned portion of the sheet of Fig. 2 downwardly into the mold cavity and into close contact with the interior surfaces thereof;

Fig. 4 is an elevational view of a modified form of apparatus for practicing the method of the present invention, certain parts being cut away for clearness of illustration;

Fig. 5 is a similar view of still another form of apparatus for the practice of the present method;

Fig. 6 is a top plan view of the apparatus of Fig. 5 with certain parts cut away;

Fig. 7 is a cross-sectional view of a representative object formed by previously known methods of draw-forming thermoplastic materials, showing a greater wall thickness in the upper portion of the object resulting in the practice of older methods;

Fig. 8 is a similar view of a representative object of the same general shape formed by the present method, showing the substantially uniform wall thickness achieved by the present method;

Fig. 9 is a cross-sectional view of still another form of apparatus for the practice of applicant's invention, showing certain parts of the apparatus separated and with a sheet of ductile thermoplastic material disposed therebetween prior to clamping and forming of the sheet; and Fig. 10 is a similar view of the same apparatus showing the sheet after it has been clamped and carried inwardly toward the mouth of the cavity of the mold to compress air entrapped thereunder and cause the sheet to balloon outwardly away from the mouth of the cavity prior to further forming operations on the sheet.

Referring now to the drawings, Figs. 1, 2 and 3 are views progressively showing certain of the important steps of the present method. The apparatus illustrated comprises a cavity mold having a body portion 10 that may be anchored upon any suitable foundation 11 by means of bolts 12. The upper face 13 of the mold body is planar and has formed therein a mold cavity 14 having the shape and configuration of an object to be formed from a hot ductile thermoplastic sheet. The cavity 14 may have any desired vessel-like shape, but for simplicity of illustration the cavity 14 in Figs. 1 to 3 has been shown to be of a shape suitable for forming a bowl-like object.

A circular passage 15 is provided within the body 10 of the mold directly below a slightly convex circular base portion 16 of the cavity, and a plurality of evenly spaced small passages 17 extend upwardly from the passage 15 and terminate as small round openings 18 located in a circle around the periphery of the base portion 16 of the cavity, this periphery being the lowest level within the cavity. The passage 15 is connected by suitable schematically illustrated piping 19 to a three-way valve 20 which has an off position (illustrated in Fig. 1), a position for admitting air under pressure into the piping 19 and the circular passage 15 and thence into the cavity 14 (illustrated in Fig. 2), and a third position shown in Fig. 3 wherein the piping 19, the passage 15 and the interior of the cavity 14 are connected to a suitable source of vacuum.

An exterior piping system for the mold assembly of Figs. 1 to 3, as well as the mold assemblies shown in the other views, is illustrated schematically in Fig. 2. Compressed air from any suitable source is introduced to the system through a pipe 21 that leads to a second three-way valve 22 having a rotatable core 23 that may be turned selectively to permit passage of the air from the pipe 21 into a pipe 24 leading directly to a Y 25, and thence through a pipe 26 to an inlet port of the three-way valve 20. In another of its selective positions the core 23 of the valve 22 will direct air from the pipe 21 through an air heating coil 27, and thence to the Y 25 and through the pipe 26 into the valve 20, the coil 27 being heated in any suitable manner, as by a gas burner 28, thereby causing air passing through the coil to be heated before it is introduced into the valve 20 and into the mold cavity.

Above the face 13 of the mold body of Figs. 1 to 3, there is a clamp plate 30 adapted to cooperate with the face 13 of the mold to clamp a ductile sheet of thermoplastic material 31 therebetween in position across the mouth of the cavity 14. The plate 30 has an opening 32 therein substantially conforming to the size and shape of the mouth of the cavity 14, and the plate 30 is carried upon the lower ends of yoke-shaped members 33 which in turn are secured to an up-standing reciprocating rod 34 which may be operated by a pneumatic piston (not shown) or by any other suitable means.

As illustrated in Figs. 1 to 3 the sheet of soft ductile thermoplastic material 31 is first laid across the face 13 of the cavity mold in position completely covering the mouth of the cavity 14 and directly beneath the clamp plate 30. The clamp plate 30 is then lowered into contact with the sheet, thereby clamping the sheet between the lower surface of the clamp plate and the face of the mold. When the sheet has been thus clamped across the mouth of the mold, the three-way valve 20 is turned to the position shown in Fig. 2 to admit air under pressure into the cavity of the mold beneath the sheet 31 through the valve 20 and piping 19 and through the circular passage 15 and the upwardly extending passages 17. The air thus admitted may first be heated by passing the same through the coil 27 (Fig. 2) or it may be bypassed around the coil 27 by turning the core 23 of the valve 22 to cause the air to pass through the pipe 24 directly to the three-way valve 20. In certain instances it is desirable to heat the air introduced into the cavity 14 so as to avoid the slight cooling effect caused by the air on the sheet 31. In other cases this slight cooling effect is not objectionable, in which case the air is by-passed around the coil 27 or the coil is entirely eliminated. Introduction of air into the cavity 14 causes the clamped sheet 31 to distend or balloon upwardly as shown in Fig. 2. This upward ballooning of the sheet prestretches the same and reduces the wall thickness of the ballooned portion to a substantially uniform thickness less than the thickness of the remainder of the sheet. After the sheet has been ballooned upwardly, the core 20a of the valve 20 is turned to the position illustrated in Fig. 3 wherein the core of the valve is connected to a pipe 35 extending to a source of vacuum (not shown). The connection of the interior of the mold cavity to this source of vacuum immediately evacuates the compressed air within the mold cavity and beneath the ballooned portion of the sheet, thereby immediately snapping the outwardly ballooned portion of the sheet inwardly into the mold substantially to the position illustrated by the broken lines 31b in Fig. 3. From this view it will be noted that the inwardly ballooned portion 31b of the sheet extends downwardly well within the mold cavity, with the upper edges of the now stretched, inwardly ballooned portion in contact with the upper portion of the walls of the cavity, this position of the sheet having been attained without previously permitting that portion of the sheet to come into cooling contact with the inner walls of the cavity. Almost instantaneously after the sheet has assumed the position illustrated at 31b in Fig. 3, the vacuum draws the sheet still further inwardly into the cavity mold and into close contact with the surfaces thereof whereupon the sheet immediately begins to cool, the body of the mold itself being cooled if desired by a flow of water or other cooling fluid passed through cooling passages 36 within the mold body.

As soon as the plastic sheet within the mold cavity 14 has cooled, it becomes substantially rigid, whereupon the valve 20 is moved to its closed position (Fig. 1), the clamp plate 30 is raised, and the formed object is withdrawn from the mold and trimmed from the remaining portion of the sheet. Ejection of the formed object from the mold may be accomplished in the usual manner by means of push-out pins (not shown), and its extraction may be materially assisted by momentarily turning the core 20a of the three-way valve 20 into alignment with the pipe 26 to introduce air under pressure into the mold cavity beneath the rigid formed object therein.

The apparatus illustrated in Fig. 4 is operated in the same manner previously described and is substantially like that shown in Figs. 1 to 3 except that a cavity 37 provided in the body 38 of the mold is substantially deeper than the cavity 14 in the first form of the apparatus and is shaped to form a tumbler-like object rather than a bowl. The form of the apparatus of Fig. 4, like the form of apparatus of Figs. 1 to 3, is provided with a clamp plate 40 that cooperates with a face 39 on the mold body for clamping a ductile thermosplastic sheet 41 across the mouth of the mold cavity, but the opening 42 in the clamp plate 40 of Fig. 4 has a diameter substantially greater than the diameter of the mouth of the cavity 37. Thus, when air is introduced under pressure through the pipe 19 and internal passages 15a and 17a into the cavity 37 beneath the clamped thermoplastic sheet, the diameter of the portion of the sheet ballooned outwardly is substantially greater than that of the mouth of the cavity, as illustrated at 41a in Fig. 4, so that when vacuum is introduced into the cavity in the manner previously explained, the outwardly ballooned portion 41a of the sheet substantially instantaneously is drawn well downwardly into the cavity substantially to the position shown by the broken lines 41b, with a very substantial portion of the effective forming of the sheet having taken place before the sheet comes into cooling contact with any of the inner surfaces of the mold. The remaining portion of the necessary stretching is quickly accomplished by the vacuum so as to complete the formation of the article before substantial cooling takes place thereby producing a deeply drawn tumbler having walls of substantially uniform thickness.

The form of the mold shown in Fig. 5 is operated in the manner previously described and is like that shown in Fig. 4 except the mold cavity 42 therein is provided with an upstanding lip 43 around its mouth for producing a tumbler having an outwardly turned lip thereon. In order that the lip will be suitably formed, the body 44 of the mold in Fig. 5 is provided with a circular air-vacuum passage 45 of greater diameter than the circular passage 15b therein. The passages 15b and 45 are interconnected and in addition to small passages 17b leading to the bottom of the cavity, a plurality of upwardly extending small passages 46 lead upwardly from the circular passage 45 and terminate in small openings 47 around the outside of the lip substantially coincident with the face 48 of the mold. When vacuum is introduced into the cavity 42 of the mold body 44 and in the internal passages 15b, 17b, 45 and 46 therein, the outwardly ballooned portion 49a of the thermoplastic sheet 49 shown clamped to the mold, is substantially instantaneously drawn downwardly into the mold in the manner shown in Fig. 4, and is also drawn tightly over the raised lip 43 of the mold.

The apparatus of Figs. 9 and 10 comprises a mold body 50 having a mold cavity 51 therein shown for purposes of illustration to be substantially of the same shape as the cavity 14 in the apparatus of Figs. 1 to 3. The base 52 of the cavity may be round, and around its periphery there are a plurality of small openings 53 leading into passages 54 that extend downwardly to a circular passage 55 connected to an outwardly extending air-vacuum pipe 56 connected to the previously mentioned three-way valve 20 which selectively interconnects the pipe 56 to the air supply line 26 and the vacuum line 35. A circular slot 57 is formed in the face 58 of the mold body 50 around the mouth of the mold cavity 51, and a cylindrical stripper ring 59 is mounted therein for reciprocal movement along the longitudinal axis thereof, this axis coinciding with the vertical geometric axis of the mold cavity 51. The inner side of the circular slot 57 may be provided with a depression for receiving a circular sealing ring 60, of rubber or the like which is slidably engaged by the inner wall of the ring 59 to prevent the passage of air between the ring 59 and the mold body. The lower part of the circular slot 57 may be vented as at 61, and compression springs 62 are located in the bottom of the slot and tend to urge the ring 59 outwardly to the position shown in Fig. 9 wherein its outer face or end 63 is disposed well above the plane of the mouth of the cavity 51. A circular clamp plate 64, having an opening 65 therein is carried by the previously mentioned yoke members 33, and the reciprocating rod 34 has a normal retracted position so that the clamp plate is spaced outwardly from the face 63 of the ring 59 in order that a hot ductile thermoplastic sheet 66 may be received therebetween. When the sheet 66 has been placed in position between the lower surface of the clamp plate 64 and the upper face 63 of the depressible ring 59, as shown in Fig. 9, the clamp plate is lowered to clamp the sheet across the ring 59. Further downward movement of the clamp plate 64 depresses and retracts the ring 59 and also carries the clamped sheet 66 downwardly toward the mouth of the cavity 51 and into contact with the face 58 of the mold. During this clamping of the sheet and its inward movement toward the mouth of the mold, the core 20a of the valve 20 is in its off position, as shown in Figs. 9 and 10, so as to prevent escape of air from the cavity. Thus the air entrapped within the cavity and within the ring 59 beneath the sheet 66 clamped thereon is compressed during the inward movement of the clamp plate 64 and the ring 59, thereby causing the sheet 66 to balloon outwardly, as shown at 66a in Fig. 10, thereby stretching and preforming that portion of the sheet preparatory to the introduction of vacuum into the cavity 51.

After the parts have been moved from the position of Fig. 9 to the position shown in Fig. 10, the valve core 20a of the valve 20 may be turned to admit further compressed air from the line 26 to cause further ballooning of the portion 66a of the sheet, if desired, to obtain further stretching. The valve core 20a is then turned to connect the pipe 56 and the inner passages 54 and 55 to the vacuum line 35 which immediately exhausts the air within the cavity 51 and effects a vacuum therein which snaps the outwardly bulged portion 66a of the sheet inwardly into the cavity mold and then draws the same further downwardly therein into close contact with the walls of the cavity where the sheet is permitted to cool and become rigid. When the sheet has cooled sufficiently, the valve 20 is turned to its off position and the rod 34 is retracted to carry the clamp plate 64 upwardly. During this upward movement the springs 62 carry the ring 59 upwardly to its initial position, thereby stripping the sheet 66 from the face of the mold and extracting the formed sheet from the mold cavity. As previously stated, this extracting operation may be assisted by the use of knock-out pins (not shown), and also by momentarily turning the core 20a of the valve 20 so as to connect the pipe 56 and the inner passages 54 and 55 in the mold body to the air pressure line 26, the introduction of air pressure between the inner surfaces of the mold cavity and the formed body therein serving to push the body outwardly with respect to the cavity.

From the foregoing description it will be understood that in the practice of the present method an area to be formed in a warm, ductile thermoplastic sheet is first distended or ballooned outwardly in one direction substantially normal to the plane of the sheet, thereby stretching that area, and is then reverse ballooned in the opposite direction to carry the sheet inwardly into a cavity of a mold, thus presenting the cavity with sheet material that has already been subjected to a substantial part of the stretching action that is necessary to cause the sheet to assume the form of the cavity. In prior methods all or substantially all of this stretching has been accomplished within the mold cavity itself and, as initially explained above, contact of the sheet upon the draw forming apparatus has caused uneven cooling to begin from the very start of the draw forming operation, with the result that the formed object has had non-uniform wall thicknesses as illustrated, by way of example, at 70 in Fig. 7. With the present method, however, wherein a substantial part of the stretching is accomplished before the sheet comes into cooling contact with the forming surfaces of the apparatus, much more uniformity in the wall thicknesses of the formed objects is obtained, as shown by way of example at 71 in Fig. 8, and much deeper drawing of the sheet may therefore be accomplished while keeping the uniformity of the wall thicknesses within permissible limits.

The foregoing description has been given for clearness of understanding only, and no unnecessary limitations should be implied therefrom, for it will be apparent to those skilled in the art that numerous variations and changes may be made in both the present method and apparatus without departing from the spirit and scope of the appended claims.

We claim:

1. The method of forming a hot ductile sheet of thermoplastic material into a three dimensional shape, comprising the steps of clamping the ductile sheet around an area thereof to be formed with said area located opposite the mouth of a cavity mold, establishing a fluid pressure differential on opposite sides of the sheet in said area with the higher pressure applied to the side of the sheet next adjacent said cavity mold to balloon at least a portion of said area outwardly with respect to the mouth of said mold, then reversing said fluid pressure differential and applying the greater pressure to the outer surface of the outwardly ballooned area to balloon at least a portion of said area inwardly into said cavity mold and cooling the inwardly ballooned area while it is in said cavity mold.

2. The method of forming a hot ductile sheet of thermoplastic material into a three dimensional shape, comprising the steps of clamping the ductile sheet around an area thereof to be formed with said area located opposite the mouth of a cavity mold, ballooning said area outwardly with respect to the mouth of said mold by applying differential fluid pressure to the opposite sides of said sheet in said area to stretch the sheet in said area, then reverse ballooning said stretched area into said mold and into close contact with the surfaces thereof by reversing the application of said fluid pressure differential on said area, and cooling the reversely ballooned area while it is in contact with said surfaces of said mold.

3. The method of forming a hot ductile sheet of thermoplastic material into a three dimensional shape, comprising the steps of clamping the ductile sheet across the mouth of a cavity mold, ballooning said sheet outwardly with respect to the mouth of said mold by introducing air under pressure into said mold to stretch said sheet, then evacuating the air from said mold to draw said stretched sheet inwardly into said mold and into contact with the surfaces thereof, and cooling the inwardly drawn sheet while it is in contact with said surfaces of said mold.

4. The method set forth in claim 3 wherein the air introduced into said cavity mold is heated prior to its introduction into said mold, thereby avoiding substantial cooling of said ductile sheet by said air.

5. The method of forming a hot ductile sheet of thermoplastic material into a three dimensional shape, comprising the steps of clamping the ductile sheet across the mouth of a cavity mold, ballooning said sheet outwardly with respect to the mouth of said mold to stretch said sheet by building up air pressure within said mold, then evacuating the air from said mold to draw said stretched sheet inwardly into said mold and into contact with the surfaces thereof, and cooling the inwardly drawn sheet while it is in contact with said surfaces of said mold.

6. The method of forming a hot ductile sheet of thermoplastic material into a three dimensional shape, comprising the steps of clamping the ductile sheet across the mouth of a cavity mold, ballooning said sheet outwardly with respect to the mouth of said mold to stretch said sheet, by building up air pressure within said mold, then evacuating the air from said mold to draw said stretched sheet inwardly into said mold and further stretching the same into conformity and into close contact with the interior surfaces of said mold, cooling the inwardly drawn sheet while it is in contact with said interior surfaces fo said mold, and then introducing air under pressure between said surfaces of said mold and the cooled sheet therein to expel said sheet from said mold.

7. The method of forming a hot ductile sheet of thermoplastic material into a three dimensional shape, comprising the steps of locating the sheet across the mouth of a cavity mold in a position spaced from the outermost face of the mold, clamping the sheet around an area thereof to be formed and perfecting a substantially air-tight seal between the sheet and said face of the mold to trap air in the cavity of said mold and in the space between said sheet and said face of said mold, ballooning said sheet outwardly with respect to the mouth of said cavity by effecting relative movement between said sheet and said mold to reduce said space to compress said entrapped air, and then evacuating said air and effecting a vacuum in the cavity of said mold to draw said ballooned sheet inwardly into said cavity and into close contact with the surfaces therein.

8. The method of forming a hot ductile sheet of thermoplastic material into a three dimensional shape, comprising the steps of locating the sheet across the mouth of a cavity mold in a position spaced from the outermost face of the mold, clamping the sheet around an area thereof to be formed and perfecting a substantially air-tight seal between the sheet and said face of the mold to entrap air in the cavity of said mold and in the space between said sheet and said face of said mold, ballooning said sheet outwardly with respect to the mouth of said cavity by moving said clamped sheet inwardly into contact with the face of said mold to compress said entrapped air, then evacuating said air and effecting a vacuum in the cavity of said mold to draw said ballooned sheet inwardly into said cavity and into close contact with the surfaces therein, cooling the inwardly drawn sheet while it is in contact with the surfaces of said cavity, and then introducing air under pressure between said surfaces of said cavity and the cooled sheet therein to expel said sheet from said cavity.

9. The method of forming a hot ductile sheet of thermoplastic material into a three dimensional shape, comprising the steps of locating the sheet across the mouth of a cavity mold in a position spaced from the outermost face of the mold, clamping the sheet around an area thereof to be formed and perfecting a substantially air-tight seal between the sheet and said face of the mold to entrap air in the cavity of said mold and in the space between said sheet and said face of said mold, ballooning said sheet outwardly with respect to the mouth of said cavity by effecting relative movement between said sheet and said mold to reduce said space and to compress said entrapped air and introducing further air into said entrapped air, then evacuating said air and effecting a vacuum in the cavity of said mold to draw said ballooned sheet inwardly into said cavity and into close contact with the surfaces therein, cooling the inwardly drawn sheet while it is in contact with the surfaces of said cavity, and then introducing air under pressure between said surfaces of said cavity and the cooled sheet therein to expel said sheet from said cavity.

References Cited in the file of this patent

UNITED STATES PATENTS

| | | |
|---|---|---|
| Re. 23,171 | Borkland | Nov. 29, 1949 |
| 601,214 | Hafely et al. | Mar. 22, 1898 |
| 2,362,672 | Sloan | Nov. 14, 1944 |
| 2,365,637 | Helwig | Dec. 19, 1944 |
| 2,367,642 | Helwig | Jan. 16, 1945 |
| 2,468,697 | Wiley | Apr. 26, 1949 |
| 2,493,439 | Braund | Jan. 3, 1950 |

OTHER REFERENCES

"Blow Molding Opens Opportunities to Plastics" (Bailey), published by "Plastics," April 1945, vol. 2, No. 4 (pages 70, 72, 74, 75, 118, 119, 120). (Copy in Scientific Library.)